(12) United States Patent
Avser et al.

(10) Patent No.: US 11,863,224 B2
(45) Date of Patent: Jan. 2, 2024

(54) MULTI-LAYER MATCHING STRUCTURES FOR HIGH FREQUENCY SIGNAL TRANSMISSION

(71) Applicant: Apple Inc., Cupertino, CA (US)

(72) Inventors: Bilgehan Avser, San Bruno, CA (US); Harish Rajagopalan, San Jose, CA (US); Jennifer M. Edwards, San Francisco, CA (US); Simone Paulotto, Redwood City, CA (US); Siwen Yong, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/223,888

(22) Filed: Apr. 6, 2021

(65) Prior Publication Data

US 2022/0109464 A1 Apr. 7, 2022

Related U.S. Application Data

(60) Provisional application No. 63/086,748, filed on Oct. 2, 2020.

(51) Int. Cl.
| | |
|---|---|
| *H04B 1/40* | (2015.01) |
| *H04M 1/02* | (2006.01) |
| *H01Q 9/04* | (2006.01) |
| *H01Q 5/335* | (2015.01) |
| *H01Q 1/24* | (2006.01) |

(52) U.S. Cl.
CPC ............... *H04B 1/40* (2013.01); *H01Q 5/335* (2015.01); *H01Q 9/0485* (2013.01); *H04M 1/026* (2013.01); *H01Q 1/243* (2013.01)

(58) Field of Classification Search
CPC ........ H01Q 1/243; H01Q 21/28; H01Q 5/335; H01Q 9/0485; H04B 1/40; H04M 1/026
See application file for complete search history.

(56) References Cited

U.S. PATENT DOCUMENTS

| | | | |
|---|---|---|---|
| 7,083,985 B2 | 8/2006 | Hefti et al. | |
| 9,667,290 B2 | 5/2017 | Ouyang et al. | |
| 9,905,928 B2 | 2/2018 | de Rochemont | |
| 10,186,769 B1* | 1/2019 | Judkins | H01Q 1/521 |
| 10,418,687 B2 | 9/2019 | Mow et al. | |
| 10,608,344 B2 | 3/2020 | Paulotto et al. | |
| 10,749,246 B2 | 8/2020 | Anguera Pros et al. | |

(Continued)

*Primary Examiner* — Nguyen T Vo
(74) *Attorney, Agent, or Firm* — Treyz Law Group, P.C.; Michael H. Lyons

(57) ABSTRACT

An electronic device may include a transmission line path having a signal conductor embedded in a substrate. A contact pad may be patterned on a surface of the substrate. A radio-frequency component may be mounted to the contact pad using solder. Multi-layer impedance matching structures may couple the signal conductor to the contact pad. The matching structures may include a set of via pads and a set of conductive vias coupled in series between the signal conductor and the contact pad. The area of the via pads may vary across the set of via pads and/or the aspect ratio of the conductive vias may vary across the set of conductive vias. The matching structures may perform impedance matching between the signal conductor and the radio-frequency component at frequencies greater than 10 GHz while occupying a minimal amount of space in the device.

19 Claims, 7 Drawing Sheets

(56) References Cited

U.S. PATENT DOCUMENTS

| | | | |
|---|---|---|---|
| 11,335,992 B2 | 5/2022 | Edwards et al. | |
| 2003/0078037 A1 | 4/2003 | Auckland et al. | |
| 2007/0126524 A1 | 6/2007 | Yagisawa | |
| 2012/0235880 A1 | 9/2012 | Kim et al. | |
| 2015/0015453 A1 | 1/2015 | Puzella et al. | |
| 2019/0097306 A1* | 3/2019 | Romano | H01Q 13/10 |
| 2019/0221929 A1* | 7/2019 | Achour | H01Q 25/00 |
| 2019/0229433 A1 | 7/2019 | Labonte et al. | |
| 2019/0312347 A1 | 10/2019 | Edwards et al. | |
| 2020/0052373 A1 | 2/2020 | Xia et al. | |
| 2020/0091608 A1 | 3/2020 | Alpman et al. | |
| 2020/0127361 A1 | 4/2020 | Lee et al. | |
| 2020/0220255 A1 | 7/2020 | Cetinoneri et al. | |
| 2020/0348393 A1 | 11/2020 | Trotta et al. | |
| 2021/0013608 A1* | 1/2021 | Takayama | H01Q 5/335 |
| 2021/0203080 A1* | 7/2021 | Wong | H01Q 21/28 |
| 2021/0210441 A1 | 7/2021 | Kim et al. | |
| 2023/0163802 A1* | 5/2023 | Woo | H04B 1/0458 455/90.2 |

\* cited by examiner

MULTI-LAYER MATCHING STRUCTURES FOR HIGH FREQUENCY SIGNAL TRANSMISSION

This application claims the benefit of provisional patent application No. 63/086,748, filed Oct. 2, 2020, which is hereby incorporated by reference herein in its entirety.

BACKGROUND

This relates generally to electronic devices and, more particularly, to electronic devices with wireless circuitry.

Electronic devices often include wireless circuitry. For example, cellular telephones, computers, and other devices often contain antennas and wireless transceivers for supporting wireless communications.

It may be desirable to support wireless communications in millimeter wave and centimeter wave communications bands. Millimeter wave communications, which are sometimes referred to as extremely high frequency (EHF) communications, and centimeter wave communications involve communications at frequencies of about 10-300 GHz. Operation at these frequencies can support high throughputs but may raise significant challenges. For example, it can be difficult to provide satisfactory impedance matching at these frequencies without consuming an excessive amount of space in the electronic device.

It would therefore be desirable to be able to provide electronic devices with improved wireless circuitry for supporting millimeter and centimeter wave communications.

SUMMARY

An electronic device may be provided with wireless circuitry. The wireless circuitry may include a radio-frequency transmission line path. The radio-frequency transmission line path may have a signal conductor embedded in a dielectric substrate. A contact pad may be patterned on a surface of the dielectric substrate. A radio-frequency component may be surface-mounted to the contact pad using solder. The radio-frequency component may be a board-to-board connector, a probe feed for an antenna, or an interposer, as examples.

Multi-layer impedance matching structures may be embedded in the dielectric substrate. The multi-layer impedance matching structures may couple the signal conductor to the contact pad. The multi-layer impedance matching structures may include a set of via pads and a set of conductive vias coupled in series between the signal conductor and the contact pad. The area of the via pads may vary across the set of via pads and/or the aspect ratio of the conductive vias may vary across the set of conductive vias. The signal trace may include a wide transition segment that forms a part of the multi-layer impedance matching structures. Ground traces in the dielectric substrate may have an opening that overlaps the radio-frequency component. The opening may help to counteract capacitances between the via pads and the ground traces. The multi-layer impedance matching structures may perform impedance matching between the signal conductor and the radio-frequency component at frequencies greater than 10 GHz while occupying a minimal amount of space in the device.

DETAILED DESCRIPTION

Figure 1:
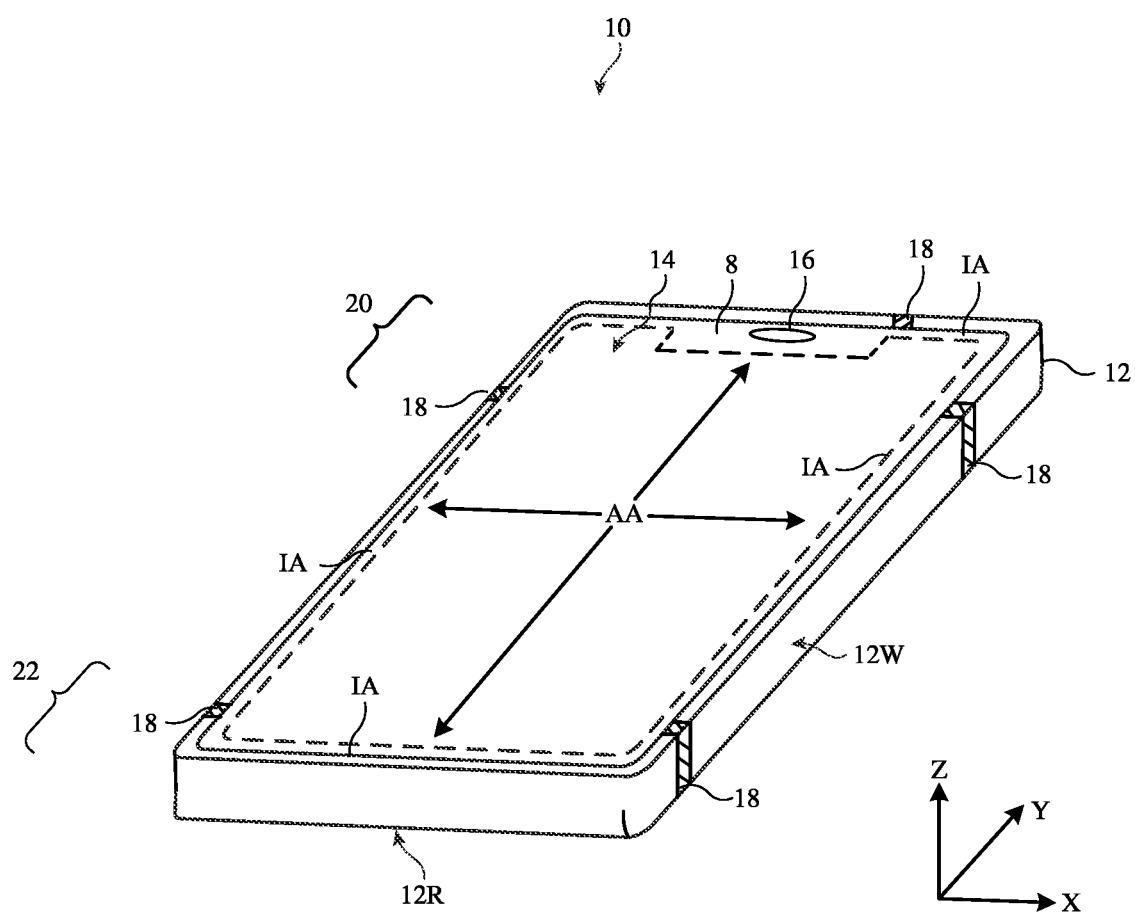
FIG. 1 is a perspective view of an illustrative electronic device in accordance with some embodiments.

An electronic device such as electronic device 10 of FIG. 1 may be provided with wireless circuitry that includes antennas. The antennas may be used to transmit and/or receive wireless radio-frequency signals. The antennas may include phased antenna arrays that are used for performing wireless communications and/or spatial ranging operations using millimeter and centimeter wave signals. Millimeter wave signals, which are sometimes referred to as extremely high frequency (EHF) signals, propagate at frequencies above about 30 GHz (e.g., at 60 GHz or other frequencies between about 30 GHz and 300 GHz). Centimeter wave signals propagate at frequencies between about 10 GHz and 30 GHz. If desired, device 10 may also contain antennas for handling satellite navigation system signals, cellular telephone signals, local wireless area network signals, near-field communications, light-based wireless communications, or other wireless communications.

Device 10 may be a portable electronic device or other suitable electronic device. For example, device 10 may be a laptop computer, a tablet computer, a somewhat smaller device such as a wrist-watch device, pendant device, headphone device, earpiece device, headset device, or other wearable or miniature device, a handheld device such as a cellular telephone, a media player, or other small portable device. Device 10 may also be a set-top box, a desktop computer, a display into which a computer or other processing circuitry has been integrated, a display without an integrated computer, a wireless access point, a wireless base station, an electronic device incorporated into a kiosk, building, or vehicle, or other suitable electronic equipment.

Device 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials. In some situations, parts of housing 12 may be formed from dielectric or other low-conductivity material (e.g., glass, ceramic, plastic, sapphire, etc.). In other situations, housing 12 or at least some of the structures that make up housing 12 may be formed from metal elements.

Device 10 may, if desired, have a display such as display 14. Display 14 may be mounted on the front face of device 10. Display 14 may be a touch screen that incorporates capacitive touch electrodes or may be insensitive to touch. The rear face of housing 12 (i.e., the face of device 10 opposing the front face of device 10) may have a substantially planar housing wall such as rear housing wall 12R (e.g., a planar housing wall). Rear housing wall 12R may have slots that pass entirely through the rear housing wall and that therefore separate portions of housing 12 from each other. Rear housing wall 12R may include conductive portions and/or dielectric portions. If desired, rear housing wall 12R may include a planar metal layer covered by a thin layer or coating of dielectric such as glass, plastic, sapphire, or ceramic (e.g., a dielectric cover layer). Housing 12 may also have shallow grooves that do not pass entirely through housing 12. The slots and grooves may be filled with plastic or other dielectric materials. If desired, portions of housing 12 that have been separated from each other (e.g., by a through slot) may be joined by internal conductive structures (e.g., sheet metal or other metal members that bridge the slot).

Housing 12 may include peripheral housing structures such as peripheral structures 12W. Conductive portions of peripheral structures 12W and conductive portions of rear housing wall 12R may sometimes be referred to herein collectively as conductive structures of housing 12. Peripheral structures 12W may run around the periphery of device 10 and display 14. In configurations in which device 10 and display 14 have a rectangular shape with four edges, peripheral structures 12W may be implemented using peripheral housing structures that have a rectangular ring shape with four corresponding edges and that extend from rear housing wall 12R to the front face of device 10 (as an example). In other words, device 10 may have a length (e.g., measured parallel to the Y-axis), a width that is less than the length (e.g., measured parallel to the X-axis), and a height (e.g., measured parallel to the Z-axis) that is less than the width. Peripheral structures 12W or part of peripheral structures 12W may serve as a bezel for display 14 (e.g., a cosmetic trim that surrounds all four sides of display 14 and/or that helps hold display 14 to device 10) if desired. Peripheral structures 12W may, if desired, form sidewall structures for device 10 (e.g., by forming a metal band with vertical sidewalls, curved sidewalls, etc.).

Peripheral structures 12W may be formed of a conductive material such as metal and may therefore sometimes be referred to as peripheral conductive housing structures, conductive housing structures, peripheral metal structures, peripheral conductive sidewalls, peripheral conductive sidewall structures, conductive housing sidewalls, peripheral conductive housing sidewalls, sidewalls, sidewall structures, or a peripheral conductive housing member (as examples). Peripheral conductive housing structures 12W may be formed from a metal such as stainless steel, aluminum, alloys, or other suitable materials. One, two, or more than two separate structures may be used in forming peripheral conductive housing structures 12W.

It is not necessary for peripheral conductive housing structures 12W to have a uniform cross-section. For example, the top portion of peripheral conductive housing structures 12W may, if desired, have an inwardly protruding ledge that helps hold display 14 in place. The bottom portion of peripheral conductive housing structures 12W may also have an enlarged lip (e.g., in the plane of the rear surface of device 10). Peripheral conductive housing structures 12W may have substantially straight vertical sidewalls, may have sidewalls that are curved, or may have other suitable shapes. In some configurations (e.g., when peripheral conductive housing structures 12W serve as a bezel for display 14), peripheral conductive housing structures 12W may run around the lip of housing 12 (i.e., peripheral conductive housing structures 12W may cover only the edge of housing 12 that surrounds display 14 and not the rest of the sidewalls of housing 12).

Rear housing wall 12R may lie in a plane that is parallel to display 14. In configurations for device 10 in which some or all of rear housing wall 12R is formed from metal, it may be desirable to form parts of peripheral conductive housing structures 12W as integral portions of the housing structures forming rear housing wall 12R. For example, rear housing wall 12R of device 10 may include a planar metal structure and portions of peripheral conductive housing structures 12W on the sides of housing 12 may be formed as flat or curved vertically extending integral metal portions of the planar metal structure (e.g., housing structures 12R and 12W may be formed from a continuous piece of metal in a unibody configuration). Housing structures such as these may, if desired, be machined from a block of metal and/or may include multiple metal pieces that are assembled together to form housing 12. Rear housing wall 12R may have one or more, two or more, or three or more portions. Peripheral conductive housing structures 12W and/or conductive portions of rear housing wall 12R may form one or more exterior surfaces of device 10 (e.g., surfaces that are visible to a user of device 10) and/or may be implemented using internal structures that do not form exterior surfaces of device 10 (e.g., conductive housing structures that are not visible to a user of device 10 such as conductive structures that are covered with layers such as thin cosmetic layers, protective coatings, and/or other coating/cover layers that may include dielectric materials such as glass, ceramic, plastic, or other structures that form the exterior surfaces of device 10 and/or serve to hide peripheral conductive housing structures 12W and/or conductive portions of rear housing wall 12R from view of the user).

Display 14 may have an array of pixels that form an active area AA that displays images for a user of device 10. For example, active area AA may include an array of display pixels. The array of pixels may be formed from liquid crystal display (LCD) components, an array of electrophoretic pixels, an array of plasma display pixels, an array of organic light-emitting diode display pixels or other light-emitting diode pixels, an array of electrowetting display pixels, or display pixels based on other display technologies. If desired, active area AA may include touch sensors such as touch sensor capacitive electrodes, force sensors, or other sensors for gathering a user input.

Display 14 may have an inactive border region that runs along one or more of the edges of active area AA. Inactive area IA of display 14 may be free of pixels for displaying images and may overlap circuitry and other internal device structures in housing 12. To block these structures from view by a user of device 10, the underside of the display cover layer or other layers in display 14 that overlap inactive area IA may be coated with an opaque masking layer in inactive area IA. The opaque masking layer may have any suitable color. Inactive area IA may include a recessed region or notch 8 that extends into active area AA (e.g., at speaker port 16). Active area AA may, for example, be defined by the lateral area of a display module for display 14 (e.g., a display module that includes pixel circuitry, touch sensor circuitry, etc.).

Display 14 may be protected using a display cover layer such as a layer of transparent glass, clear plastic, transparent ceramic, sapphire, or other transparent crystalline material, or other transparent layer(s). The display cover layer may have a planar shape, a convex curved profile, a shape with planar and curved portions, a layout that includes a planar main area surrounded on one or more edges with a portion that is bent out of the plane of the planar main area, or other suitable shapes. The display cover layer may cover the entire front face of device 10. In another suitable arrangement, the display cover layer may cover substantially all of the front face of device 10 or only a portion of the front face of device 10. Openings may be formed in the display cover layer. For example, an opening may be formed in the display cover layer to accommodate a button. An opening may also be formed in the display cover layer to accommodate ports such as speaker port 16 or a microphone port. Openings may be formed in housing 12 to form communications ports (e.g., an audio jack port, a digital data port, etc.) and/or audio ports for audio components such as a speaker and/or a microphone if desired.

Display 14 may include conductive structures such as an array of capacitive electrodes for a touch sensor, conductive lines for addressing pixels, driver circuits, etc. Housing 12 may include internal conductive structures such as metal frame members and a planar conductive housing member (sometimes referred to as a conductive support plate or backplate) that spans the walls of housing 12 (e.g., a substantially rectangular sheet formed from one or more metal parts that is welded or otherwise connected between opposing sides of peripheral conductive housing structures 12W). The conductive support plate may form an exterior rear surface of device 10 or may be covered by a dielectric cover layer such as a thin cosmetic layer, protective coating, and/or other coatings that may include dielectric materials such as glass, ceramic, plastic, or other structures that form the exterior surfaces of device 10 and/or serve to hide the conductive support plate from view of the user (e.g., the conductive support plate may form part of rear housing wall 12R). Device 10 may also include conductive structures such as printed circuit boards, components mounted on printed circuit boards, and other internal conductive structures. These conductive structures, which may be used in forming a ground plane in device 10, may extend under active area AA of display 14, for example.

In regions 22 and 20, openings may be formed within the conductive structures of device 10 (e.g., between peripheral conductive housing structures 12W and opposing conductive ground structures such as conductive portions of rear housing wall 12R, conductive traces on a printed circuit board, conductive electrical components in display 14, etc.). These openings, which may sometimes be referred to as gaps, may be filled with air, plastic, and/or other dielectrics and may be used in forming slot antenna resonating elements for one or more antennas in device 10, if desired.

Conductive housing structures and other conductive structures in device 10 may serve as a ground plane for the antennas in device 10. The openings in regions 22 and 20 may serve as slots in open or closed slot antennas, may serve as a central dielectric region that is surrounded by a conductive path of materials in a loop antenna, may serve as a space that separates an antenna resonating element such as a strip antenna resonating element or an inverted-F antenna resonating element from the ground plane, may contribute to the performance of a parasitic antenna resonating element, or may otherwise serve as part of antenna structures formed in regions 22 and 20. If desired, the ground plane that is under active area AA of display 14 and/or other metal structures in device 10 may have portions that extend into parts of the ends of device 10 (e.g., the ground may extend towards the dielectric-filled openings in regions 22 and 20), thereby narrowing the slots in regions 22 and 20. Region 22 may sometimes be referred to herein as lower region 22 or lower end 22 of device 10. Region 20 may sometimes be referred to herein as upper region 20 or upper end 20 of device 10.

In general, device 10 may include any suitable number of antennas (e.g., one or more, two or more, three or more, four or more, etc.). The antennas in device 10 may be located at opposing first and second ends of an elongated device housing (e.g., at lower region 22 and/or upper region 20 of device 10 of FIG. 1), along one or more edges of a device housing, in the center of a device housing, in other suitable locations, or in one or more of these locations. The arrangement of FIG. 1 is merely illustrative.

Portions of peripheral conductive housing structures 12W may be provided with peripheral gap structures. For example, peripheral conductive housing structures 12W may be provided with one or more dielectric-filled gaps such as gaps 18, as shown in FIG. 1. The gaps in peripheral conductive housing structures 12W may be filled with dielectric such as polymer, ceramic, glass, air, other dielectric materials, or combinations of these materials. Gaps 18 may divide peripheral conductive housing structures 12W into one or more peripheral conductive segments. The conductive segments that are formed in this way may form parts of antennas in device 10 if desired. Other dielectric openings may be formed in peripheral conductive housing structures 12W (e.g., dielectric openings other than gaps 18) and may serve as dielectric antenna windows for antennas mounted within the interior of device 10. Antennas within device 10 may be aligned with the dielectric antenna windows for conveying radio-frequency signals through peripheral conductive housing structures 12W. Antennas within device 10 may also be aligned with inactive area IA of display 14 for conveying radio-frequency signals through display 14.

In order to provide an end user of device 10 with as large of a display as possible (e.g., to maximize an area of the device used for displaying media, running applications, etc.), it may be desirable to increase the amount of area at the front face of device 10 that is covered by active area AA of display 14. Increasing the size of active area AA may reduce the size of inactive area IA within device 10. This may reduce the area behind display 14 that is available for antennas within device 10. For example, active area AA of display 14 may include conductive structures that serve to block radio-frequency signals handled by antennas mounted behind active area AA from radiating through the front face of device 10. It would therefore be desirable to be able to provide antennas that occupy a small amount of space within device 10 (e.g., to allow for as large of a display active area AA as possible) while still allowing the antennas to communicate with wireless equipment external to device 10 with satisfactory efficiency bandwidth.

In a typical scenario, device 10 may have one or more upper antennas and one or more lower antennas. An upper antenna may, for example, be formed in upper region 20 of device 10. A lower antenna may, for example, be formed in lower region 22 of device 10. Additional antennas may be formed along the edges of housing 12 extending between regions 20 and 22 if desired. An example in which device 10 includes three or four upper antennas and five lower antennas is described herein as an example. The antennas may be used separately to cover identical communications bands, overlapping communications bands, or separate communications bands. The antennas may be used to implement an antenna diversity scheme or a multiple-input-multiple-output (MIMO) antenna scheme. Other antennas for covering any other desired frequencies may also be mounted at any desired locations within the interior of device 10. The example of FIG. 1 is merely illustrative. If desired, housing 12 may have other shapes (e.g., a square shape, cylindrical shape, spherical shape, combinations of these and/or different shapes, etc.).

Figure 2:
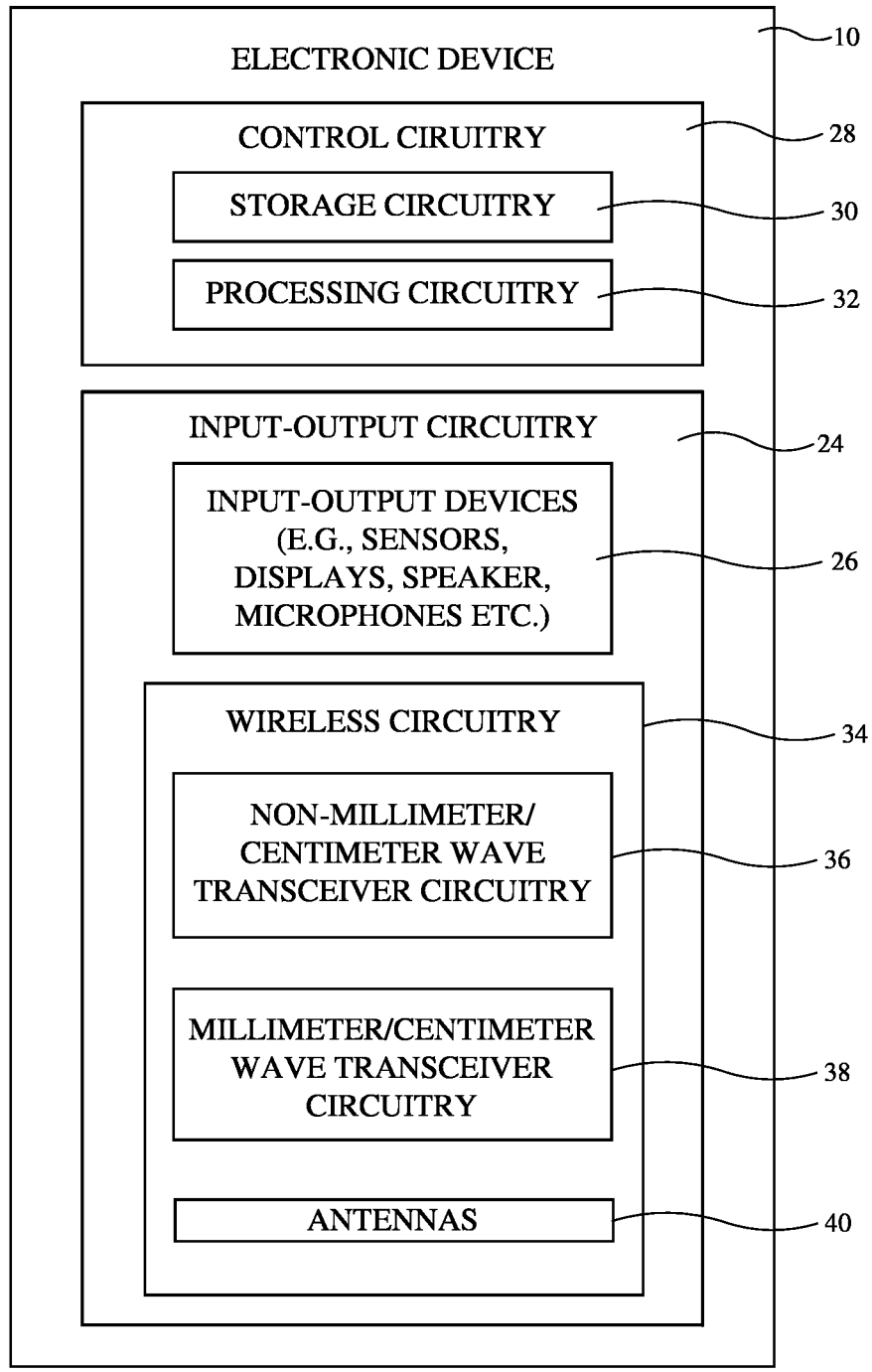
FIG. 2 is a schematic diagram of illustrative circuitry in an electronic device in accordance with some embodiments.

A schematic diagram of illustrative components that may be used in device 10 is shown in FIG. 2. As shown in FIG. 2, device 10 may include control circuitry 28. Control circuitry 28 may include storage such as storage circuitry 30. Storage circuitry 30 may include hard disk drive storage, nonvolatile memory (e.g., flash memory or other electrically-programmable-read-only memory configured to form a solid-state drive), volatile memory (e.g., static or dynamic random-access-memory), etc.

Control circuitry 28 may include processing circuitry such as processing circuitry 32. Processing circuitry 32 may be used to control the operation of device 10. Processing circuitry 32 may include on one or more microprocessors, microcontrollers, digital signal processors, host processors, baseband processor integrated circuits, application specific integrated circuits, central processing units (CPUs), etc. Control circuitry 28 may be configured to perform operations in device 10 using hardware (e.g., dedicated hardware or circuitry), firmware, and/or software. Software code for performing operations in device 10 may be stored on storage circuitry 30 (e.g., storage circuitry 30 may include non-transitory (tangible) computer readable storage media that stores the software code). The software code may sometimes be referred to as program instructions, software, data, instructions, or code. Software code stored on storage circuitry 30 may be executed by processing circuitry 32.

Control circuitry 28 may be used to run software on device 10 such as internet browsing applications, voice-over-internet-protocol (VOIP) telephone call applications, email applications, media playback applications, operating system functions, etc. To support interactions with external equipment, control circuitry 28 may be used in implementing communications protocols. Communications protocols that may be implemented using control circuitry 28 include internet protocols, wireless local area network protocols (e.g., IEEE 802.11 protocols—sometimes referred to as WiFi®), protocols for other short-range wireless communications links such as the Bluetooth® protocol or other WPAN protocols, IEEE 802.11ad protocols, cellular telephone protocols, MIMO protocols, antenna diversity protocols, satellite navigation system protocols, antenna-based spatial ranging protocols (e.g., radio detection and ranging (RADAR) protocols or other desired range detection protocols for signals conveyed at millimeter and centimeter wave frequencies), etc. Each communication protocol may be associated with a corresponding radio access technology (RAT) that specifies the physical connection methodology used in implementing the protocol.

Device 10 may include input-output circuitry 24. Input-output circuitry 24 may include input-output devices 26. Input-output devices 26 may be used to allow data to be supplied to device 10 and to allow data to be provided from device 10 to external devices. Input-output devices 26 may include user interface devices, data port devices, sensors, and other input-output components. For example, input-output devices may include touch screens, displays without touch sensor capabilities, buttons, joysticks, scrolling wheels, touch pads, key pads, keyboards, microphones, cameras, speakers, status indicators, light sources, audio jacks and other audio port components, digital data port devices, light sensors, gyroscopes, accelerometers or other components that can detect motion and device orientation relative to the Earth, capacitance sensors, proximity sensors (e.g., a capacitive proximity sensor and/or an infrared proximity sensor), magnetic sensors, and other sensors and input-output components.

Input-output circuitry 24 may include wireless circuitry such as wireless circuitry 34 for wirelessly conveying radio-frequency signals. While control circuitry 28 is shown separately from wireless circuitry 34 in the example of FIG. 2 for the sake of clarity, wireless circuitry 34 may include processing circuitry that forms a part of processing circuitry 32 and/or storage circuitry that forms a part of storage circuitry 30 of control circuitry 28 (e.g., portions of control circuitry 28 may be implemented on wireless circuitry 34). As an example, control circuitry 28 may include baseband processor circuitry or other control components that form a part of wireless circuitry 34.

Wireless circuitry 34 may include millimeter and centimeter wave transceiver circuitry such as millimeter/centimeter wave transceiver circuitry 38. Millimeter/centimeter wave transceiver circuitry 38 may support communications at frequencies between about 10 GHz and 300 GHz. For example, millimeter/centimeter wave transceiver circuitry 38 may support communications in Extremely High Frequency (EHF) or millimeter wave communications bands between about 30 GHz and 300 GHz and/or in centimeter wave communications bands between about 10 GHz and 30 GHz (sometimes referred to as Super High Frequency (SHF) bands). As examples, millimeter/centimeter wave transceiver circuitry 38 may support communications in an IEEE K communications band between about 18 GHz and 27 GHz, a $K_a$ communications band between about 26.5 GHz and 40 GHz, a $K_u$ communications band between about 12 GHz and 18 GHz, a V communications band between about 40 GHz and 75 GHz, a W communications band between about 75 GHz and 110 GHz, or any other desired frequency band between approximately 10 GHz and 300 GHz. If desired, millimeter/centimeter wave transceiver circuitry 38 may support IEEE 802.11ad communications at 60 GHz (e.g., WiGig or 60 GHz Wi-Fi bands around 57-61 GHz), and/or $5^{th}$ generation mobile networks or $5^{th}$ generation wireless systems (5G) New Radio (NR) Frequency Range 2 (FR2) communications bands between about 24 GHz and 90 GHz. Millimeter/centimeter wave transceiver circuitry 38 may be formed from one or more integrated circuits (e.g., multiple integrated circuits mounted on a common printed circuit in a system-in-package device, one or more integrated circuits mounted on different substrates, etc.).

Millimeter/centimeter wave transceiver circuitry 38 (sometimes referred to herein simply as transceiver circuitry 38 or millimeter/centimeter wave circuitry 38) may perform spatial ranging operations using radio-frequency signals at millimeter and/or centimeter wave frequencies that are transmitted and received by millimeter/centimeter wave transceiver circuitry 38. The received signals may be a version of the transmitted signals that have been reflected off of external objects and back towards device 10. Control circuitry 28 may process the transmitted and received signals to detect or estimate a range between device 10 and one or more external objects in the surroundings of device 10 (e.g., objects external to device 10 such as the body of a user or other persons, other devices, animals, furniture, walls, or other objects or obstacles in the vicinity of device 10). If desired, control circuitry 28 may also process the transmitted and received signals to identify a two or three-dimensional spatial location of the external objects relative to device 10.

Spatial ranging operations performed by millimeter/centimeter wave transceiver circuitry 38 are unidirectional. If desired, millimeter/centimeter wave transceiver circuitry 38 may also perform bidirectional communications with external wireless equipment such as external wireless equipment 10 (e.g., over a bi-directional millimeter/centimeter wave wireless communications link). The external wireless equipment may include other electronic devices such as electronic device 10, a wireless base station, wireless access point, a wireless accessory, or any other desired equipment that transmits and receives millimeter/centimeter wave signals. Bidirectional communications involve both the transmission of wireless data by millimeter/centimeter wave transceiver circuitry 38 and the reception of wireless data that has been transmitted by external wireless equipment. The wireless data may, for example, include data that has been encoded into corresponding data packets such as wireless data associated with a telephone call, streaming media content, internet browsing, wireless data associated with software applications running on device 10, email messages, etc.

If desired, wireless circuitry 34 may include transceiver circuitry for handling communications at frequencies below 10 GHz such as non-millimeter/centimeter wave transceiver circuitry 36. For example, non-millimeter/centimeter wave transceiver circuitry 36 may handle wireless local area network (WLAN) communications bands such as the 2.4 GHz and 5 GHz Wi-Fi® (IEEE 802.11) bands, wireless personal area network (WPAN) communications bands such as the 2.4 GHz Bluetooth® communications band, cellular telephone communications bands such as a cellular low band (LB) (e.g., 600 to 960 MHz), a cellular low-midband (LMB) (e.g., 1400 to 1550 MHz), a cellular midband (MB) (e.g., from 1700 to 2200 MHz), a cellular high band (HB) (e.g., from 2300 to 2700 MHz), a cellular ultra-high band (UHB) (e.g., from 3300 to 5000 MHz, or other cellular communications bands between about 600 MHz and about 5000 MHz (e.g., 3G bands, 4G LTE bands, 5G New Radio Frequency Range 1 (FR1) bands below 10 GHz, etc.), a near-field communications (NFC) band (e.g., at 13.56 MHz), satellite navigations bands (e.g., an L1 global positioning system (GPS) band at 1575 MHz, an L5 GPS band at 1176 MHz, a Global Navigation Satellite System (GLONASS) band, a BeiDou Navigation Satellite System (BDS) band, etc.), ultra-wideband (UWB) communications band(s) supported by the IEEE 802.15.4 protocol and/or other UWB communications protocols (e.g., a first UWB communications band at 6.5 GHz and/or a second UWB communications band at 8.0 GHz), and/or any other desired communications bands. The communications bands handled by the radio-frequency transceiver circuitry may sometimes be referred to herein as frequency bands or simply as "bands," and may span corresponding ranges of frequencies. Non-millimeter/centimeter wave transceiver circuitry 36 and millimeter/centimeter wave transceiver circuitry 38 may each include one or more integrated circuits, power amplifier circuitry, low-noise input amplifiers, passive radio-frequency components, switching circuitry, transmission line structures, and other circuitry for handling radio-frequency signals.

In general, the transceiver circuitry in wireless circuitry 34 may cover (handle) any desired frequency bands of interest. As shown in FIG. 2, wireless circuitry 34 may include antennas 40. The transceiver circuitry may convey radio-frequency signals using one or more antennas 40 (e.g., antennas 40 may convey the radio-frequency signals for the transceiver circuitry). The term "convey radio-frequency signals" as used herein means the transmission and/or reception of the radio-frequency signals (e.g., for performing unidirectional and/or bidirectional wireless communications with external wireless communications equipment). Antennas 40 may transmit the radio-frequency signals by radiating the radio-frequency signals into free space (or to freespace through intervening device structures such as a dielectric cover layer). Antennas 40 may additionally or alternatively receive the radio-frequency signals from free space (e.g., through intervening devices structures such as a dielectric cover layer). The transmission and reception of radio-frequency signals by antennas 40 each involve the excitation or resonance of antenna currents on an antenna resonating element in the antenna by the radio-frequency signals within the frequency band(s) of operation of the antenna.

In satellite navigation system links, cellular telephone links, and other long-range links, radio-frequency signals are typically used to convey data over thousands of feet or miles. In Wi-Fi® and Bluetooth® links at 2.4 and 5 GHz and other short-range wireless links, radio-frequency signals are typically used to convey data over tens or hundreds of feet. Millimeter/centimeter wave transceiver circuitry 38 may convey radio-frequency signals over short distances that travel over a line-of-sight path. To enhance signal reception for millimeter and centimeter wave communications, phased antenna arrays and beam forming (steering) techniques may be used (e.g., schemes in which antenna signal phase and/or magnitude for each antenna in an array are adjusted to perform beam steering). Antenna diversity schemes may also be used to ensure that the antennas that have become blocked or that are otherwise degraded due to the operating environment of device 10 can be switched out of use and higher-performing antennas used in their place.

Antennas 40 in wireless circuitry 34 may be formed using any suitable antenna types. For example, antennas 40 may include antennas with resonating elements that are formed from stacked patch antenna structures, loop antenna structures, patch antenna structures, inverted-F antenna structures, slot antenna structures, planar inverted-F antenna structures, monopole antenna structures, dipole antenna structures, helical antenna structures, Yagi (Yagi-Uda) antenna structures, hybrids of these designs, etc. In another suitable arrangement, antennas 40 may include antennas with dielectric resonating elements such as dielectric resonator antennas. If desired, one or more of antennas 40 may be cavity-backed antennas. Different types of antennas may be used for different bands and combinations of bands. For example, one type of antenna may be used in forming a non-millimeter/centimeter wave wireless link for non-millimeter/centimeter wave transceiver circuitry 36 and another type of antenna may be used in conveying radio-frequency signals at millimeter and/or centimeter wave frequencies for millimeter/centimeter wave transceiver circuitry 38. Antennas 40 that are used to convey radio-frequency signals at millimeter and centimeter wave frequencies may be arranged in one or more phased antenna arrays. The phased antenna arrays may convey radio-frequency signals using signal beam that is steered (e.g., by adjusting the phase and magnitude of each antenna) to point in a desired beam direction (e.g., towards external communications equipment).

Figure 3:
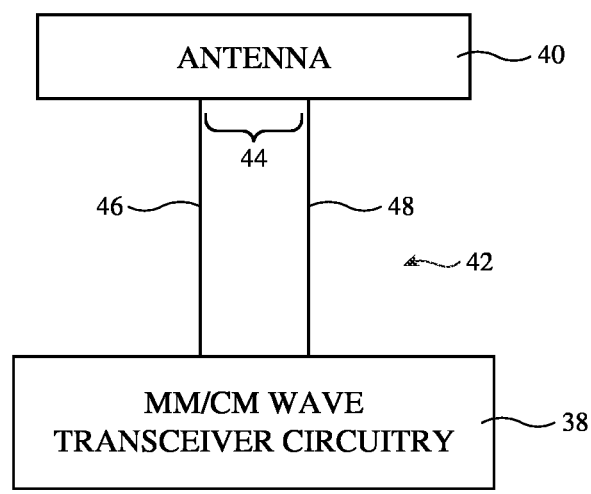
FIG. 3 is a schematic diagram of illustrative wireless circuitry in accordance with some embodiments.

A schematic diagram of an antenna 40 that may be formed in a phased antenna array for conveying radio-frequency signals at millimeter and centimeter wave frequencies is shown in FIG. 3. As shown in FIG. 3, antenna 40 may be coupled to millimeter/centimeter (MM/CM) wave transceiver circuitry 38. Millimeter/centimeter wave transceiver circuitry 38 may be coupled to antenna feed 44 of antenna 40 using a radio-frequency transmission line path such as transmission line path 42. Transmission line path 42 may include a positive signal conductor such as signal conductor 46 and may include a ground conductor such as ground conductor 48. Ground conductor 48 may be coupled to the antenna ground for antenna 40 (e.g., over a ground antenna feed terminal of antenna feed 44 located at the antenna ground). Signal conductor 46 may be coupled to the antenna resonating element for antenna 40. For example, signal conductor 46 may be coupled to a positive antenna feed terminal of antenna feed 44 located at the antenna resonating element.

In another suitable arrangement, antenna 40 may be a probe-fed antenna that is fed using a feed probe. In this arrangement, antenna feed 44 may be implemented as a feed probe. Signal conductor 46 may be coupled to the feed probe. Transmission line path 42 may convey radio-frequency signals to and from the feed probe. When radio-frequency signals are being transmitted over the feed probe and the antenna, the feed probe may excite the resonating element for the antenna (e.g., may excite electromagnetic resonant modes of a dielectric antenna resonating element for antenna 40). The resonating element may radiate the radio-frequency signals in response to excitation by the feed probe. Similarly, when radio-frequency signals are received by the antenna (e.g., from free space), the radio-frequency signals may excite the resonating element for the antenna (e.g., may excite electromagnetic resonant modes of the dielectric antenna resonating element for antenna 40). This may produce antenna currents on the feed probe and the corresponding radio-frequency signals may be passed to the transceiver circuitry over the radio-frequency transmission line.

Transmission line path 42 may include a stripline transmission line (sometimes referred to herein simply as a stripline), a coaxial cable, a coaxial probe realized by metalized vias, a microstrip transmission line, an edge-coupled microstrip transmission line, an edge-coupled stripline transmission lines, a waveguide structure, combinations of these, etc. Multiple types of transmission lines may be used to form the transmission line path that couples millimeter/centimeter wave transceiver circuitry 38 to antenna feed 44. Filter circuitry, switching circuitry, impedance matching circuitry, phase shifter circuitry, amplifier circuitry, and/or other circuitry may be interposed on transmission line path 42, if desired.

Radio-frequency transmission lines transmission line path 42 may be integrated into ceramic substrates, rigid printed circuit boards, and/or flexible printed circuits. In one suitable arrangement, radio-frequency transmission lines in device 10 may be integrated within multilayer laminated structures (e.g., layers of a conductive material such as copper and a dielectric material such as a resin that are laminated together without intervening adhesive) that may be folded or bent in multiple dimensions (e.g., two or three dimensions) and that maintain a bent or folded shape after bending (e.g., the multilayer laminated structures may be folded into a particular three-dimensional shape to route around other device components and may be rigid enough to hold its shape after folding without being held in place by stiffeners or other structures). All of the multiple layers of the laminated structures may be batch laminated together (e.g., in a single pressing process) without adhesive (e.g., as opposed to performing multiple pressing processes to laminate multiple layers together with adhesive).

In general, it may be desirable to perform impedance matching along transmission line 42 to minimize signal reflections along the transmission line. This may in turn serve to maximize the antenna efficiency of antenna 40. However, contact pads along transmission line path 42 are not naturally matched. In addition, it can be difficult to perform impedance matching at relatively high frequencies such as frequencies greater than 10 GHz. For example, packaged impedance matching components for performing impedance matching at these frequencies and any associated switching circuitry may be undesirably bulky and may not fit within the small form factor of device 10.

Figure 4:
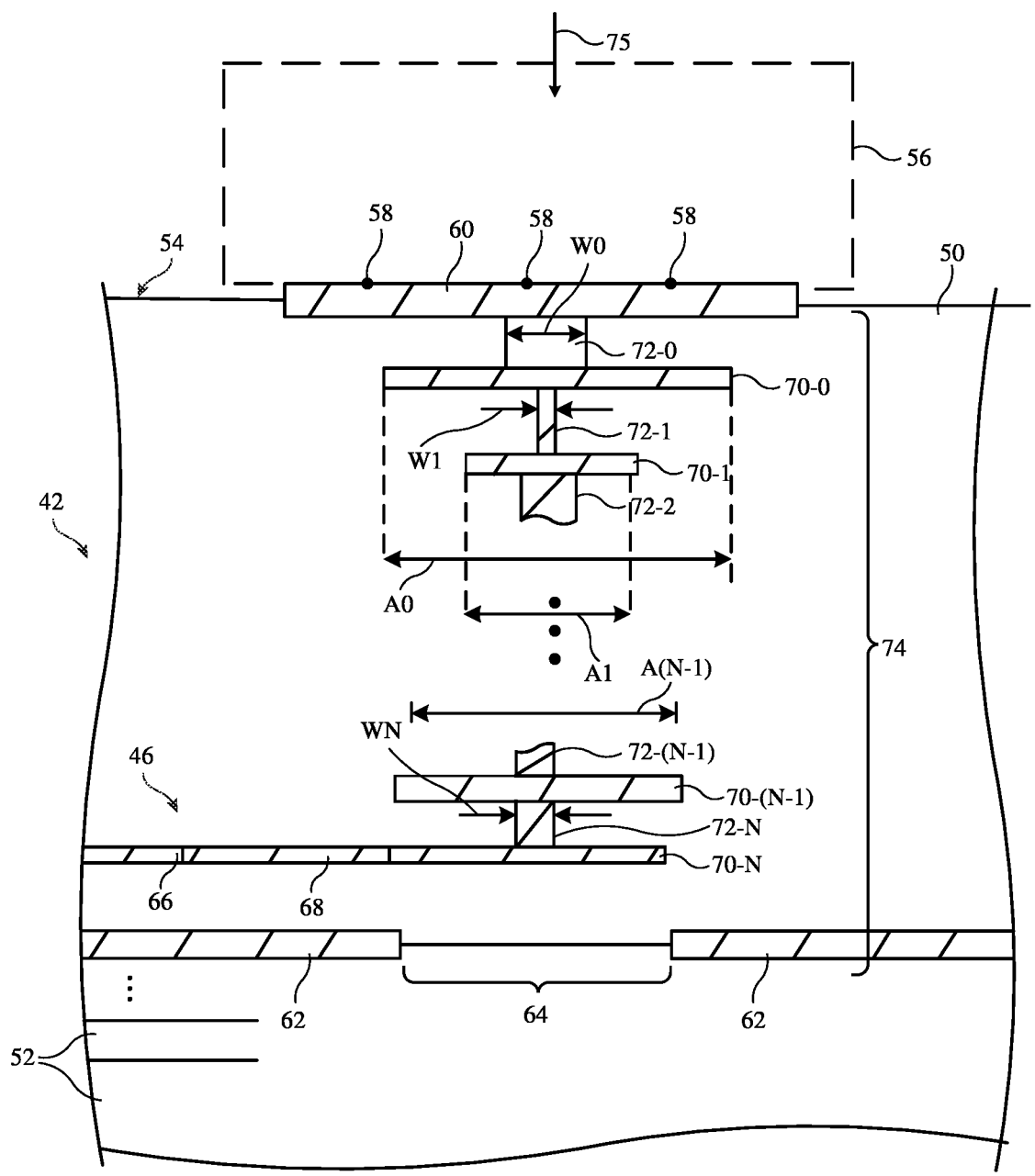
FIG. 4 is a cross-sectional side view of illustrative multi-layer impedance matching structures in accordance with some embodiments.

In order to mitigate these issues, device 10 may include multi-layer impedance matching structures interposed along transmission line path 42. FIG. 4 is a cross sectional side view showing how transmission line path 42 may include multi-layer impedance matching structures. As shown in FIG. 4, transmission line path 42 may include multi-layer impedance matching structures 74. Multi-layer impedance matching structures 74 may be integrated (embedded) within a dielectric substrate such as substrate 50.

Substrate 50 may be, for example, a rigid printed circuit board, a flexible printed circuit, or another dielectric substrate. Substrate 50 may include multiple stacked dielectric layers 52 (e.g., layers of printed circuit board substrate, layers of fiberglass-filled epoxy, layers of polyimide, layers of ceramic substrate, or layers of other dielectric materials). If desired, a radio-frequency integrated circuit (RFIC) may be mounted to substrate 50 to form an integrated antenna module. Substrate 50 may be used to route transmission lines for each of the antennas 40 in a given phased antenna array, if desired.

Substrate 50 may include ground traces such as ground traces 62. Ground traces 62 may, for example, be patterned onto a first layer 52 of substrate 50. Ground traces 62 may form part of ground conductor 48 (FIG. 3) for transmission line path 42. The signal conductor 46 of transmission line path 42 may include signal traces 66 and 68 patterned onto a second layer 52 of substrate 50 (e.g., where the second layer 52 is layered over the first layer 52 of substrate 50). Multi-layer impedance matching structures 74 may couple signal traces 66 to contact pad 60 at upper-most surface 54 of substrate 50. Contact pad 60 may be, for example, a surface-mount technology (SMT) contact pad patterned onto surface 54 of substrate 50 (e.g., on the upper-most layer 52 of substrate 50). If desired, an optional hole or opening such as opening 64 may be formed in ground traces 62. Contact pad 60 may completely or partially overlap opening 64.

Multi-layer impedance matching structures 74 may include signal trace 68, opening 64, and a set of N conductive via pads 70 and N conductive vias 72 coupled in series between signal trace 68 and contact pad 60. Each conductive via pad 70 may be patterned onto a respective layer 52 of substrate 50. Each conductive via 72 may extend through a respective layer 52 of substrate 50. Conductive via pads 70 may include, for example, a first via pad 70-0 coupled to contact pad 60 by a first conductive via 72-0, a second via pad 70-1 coupled to via pad 70-0 by a second conductive via 72-1, an Nth via pad 70-N coupled to signal trace 68 (e.g., via pad 70-N, signal trace 68, and signal trace 66 may be formed from the same layer of conductive traces on the same layer 52 of substrate 50), an (N−1)th via pad 70-(N−1) coupled to via pad 70-N by an Nth conductive via 72-N, and N−4 via pads 70 coupled between via pads 70-1 and 70-2 by N−4 conductive vias 72 (e.g., including conductive vias 72-2 and 72-(N−1)). N may be any desired integer (e.g., two, three, four, five, six, seven, eight, nine, ten, eleven, twelve, thirteen, greater than thirteen, etc.).

Each via pad 70 may have a corresponding lateral area A (e.g., as measured into and out of the plane of the page of FIG. 4). Each conductive via may have a corresponding width W (e.g., as measured from the left to the right of the page of FIG. 4). Each conductive via may also have a corresponding aspect ratio given by the ratio of the height of the conductive via (e.g., as measured from the top to the bottom of the page of FIG. 4) to one-half of the width W (e.g., the radius) of the conductive via. The aspect ratios of conductive vias 72 and/or the areas A of via pads 70 may be varied across the N conductive vias 72 and the N via pads 70 to perform impedance matching between contact pad 60 and signal trace 66. The aspect ratio of conductive vias 72 may vary between about 0.75 and 0.85, as one example.

For example, as shown in FIG. 4, conductive via 72-0 may have a first width W0 and thus a first aspect ratio, conductive via 72-1 may have a second width W1 that is less than width W0 and thus may have a second aspect ratio that is greater than the first aspect ratio, conductive via 72-N may have an Nth width WN that is different from widths W0 and W1 and thus may have an Nth aspect ratio that is different from the first and second aspect ratios, etc. In addition, as shown in FIG. 4, via pad 70-0 may have a first area A0, via pad 70-1 may have a second area A1 that is less than area A0, via pad 70-(N−1) may have an (N−1)th area A(N−1) that is greater than area A2 and less than area A1, etc. These examples are merely illustrative and, in general, each via pad 70 may have any desired area A and each conductive via 72 may have any desired aspect ratio.

Each via pad 70 may have a different respective area A or two or more of the via pads 70 may have the same area A. Similarly, each conductive via 72 may have a different respective width W and thus a different respective aspect ratio or two or more of the conductive vias 72 may have the same aspect ratio. In other words, the aspect ratio of conductive vias 72 may vary across the set of N conductive vias in multi-layer impedance matching structures 74 and/or the lateral area of the via pads 70 may vary across the set of N via pads in multi-layer impedance matching structures 74. The aspect ratios (e.g., widths W) and areas A in multi-layer impedance matching structures 74 may be selected to provide suitable impedance matching between signal trace 66 and contact pad 60 at the frequencies of the radio-frequency signals conveyed by transmission line path 42 (e.g., frequencies greater than 10 GHz).

For example, the width W of each conductive via 72 may be selected to interpose a desired inductance L between the conductive pads coupled to that conductive via 72. In general, increasing width W (e.g., decreasing the aspect ratio) reduces the inductance L produced by a given conductive via 72 whereas decreasing width W (e.g., increasing the aspect ratio) increases the inductance L produced by the conductive via. At the same time, the area A of each via pad 70 may be selected to interpose a desired capacitance C between signal trace 68 and contact pad 60. In general, increasing area A increases the capacitance produced by a given via pad 70 whereas decreasing area A decreases the capacitance produced by the via pad. The capacitances (e.g., areas A) and the inductances (e.g., widths W) may be selected to ensure that there is a smooth impedance transition between signal trace 66 and contact pad 60 at millimeter/centimeter wave frequencies.

In some scenarios, increasing the area A of via pads 70 may undesirably increase the capacitance between the via pads and ground traces 62. In these scenarios, opening 64 in ground traces 62 may help to counteract this increased capacitance. Multi-layer impedance matching structures 74 may also include signal trace 68. Signal trace 68 may have a width that is different from the width of signal trace 66. This may configure signal trace 68 to help perform impedance matching between signal trace 66 and contact pad 60.

A radio-frequency structure such as radio-frequency component 56 may be mounted to contact pad 60 (e.g., using solder 58). Radio-frequency component 56 may, for example, be surface-mounted to contact pad 60 (e.g., using an SMT process or hot-bar process). Radio-frequency component 56 may include any desired radio-frequency structures for conveying radio-frequency signals at frequencies greater than 10 GHz such as a board-to-board connector (e.g., for coupling contact pad 60 to other portions of transmission line path 42 that are located on another substrate and that are coupled to one or more antennas or to the millimeter/centimeter wave transceiver), an interposer (e.g., an interposer having conductive structures for coupling contact pad 60 to one or more antennas or to the millimeter/centimeter wave transceiver), or the antenna feed of a given antenna (e.g., antenna feed 44 of antenna 40 of FIG. 3), as examples.

Figure 5:
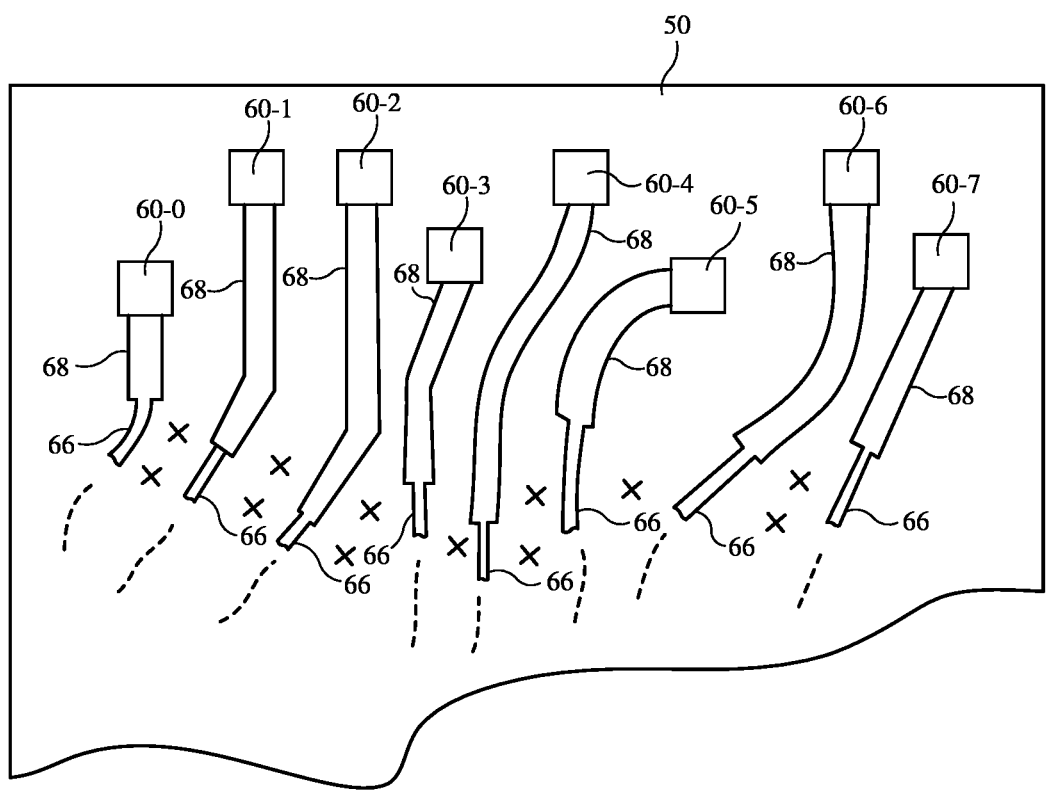
FIG. 5 is a top view showing how illustrative multi-layer impedance matching structures may include transmission line transition segments with different widths in accordance with some embodiments.

FIG. 5 is a top view showing how signal trace 68 may have a width that is different from the width of signal trace 66 (e.g., as taken in the direction of arrow 75 of FIG. 4). As shown in FIG. 5, substrate 50 may be used to route multiple transmission line paths for multiple antennas (e.g., multiple antennas in a phased antenna array). In the example of FIG. 5, substrate 50 includes eight contact pads 60 for eight different antennas in a given eight-element phased antenna array (e.g., a first contact pad 60-0 for a first antenna in the phased antenna array, a second contact pad 60-1 for a second antenna in the phased antenna array, etc.).

In one suitable arrangement that is described herein as an example, radio-frequency component 56 of FIG. 4 includes a probe feed for a dielectric resonator antenna. Each contact pad 60 as shown in FIG. 5 may be coupled to a respective probe feed for a respective dielectric resonator antenna in the phased antenna array. The phased antenna array may, if desired, be mounted in alignment with notch 8 in inactive area IA of display 14 (FIG. 1) for radiating through a display cover in display 14 (e.g., for radiating through the front face of device 10 at notch 8).

As shown in FIG. 5, each contact pad 60 may be coupled to a respective signal trace 68 (e.g., by an underlying stack of conductive vias and via pads). Each signal trace 68 may, if desired, be thicker than the corresponding signal trace 66. This may configure signal trace 68 to help perform impedance matching between the corresponding signal trace 66 and contact pad 60. Fences of grounded vias may be interposed between signal traces 66 for isolation if desired. The example of FIG. 5 is merely illustrative. The signal traces may have other shapes. The phased antenna array may include any desired number of antennas.

Figure 6:
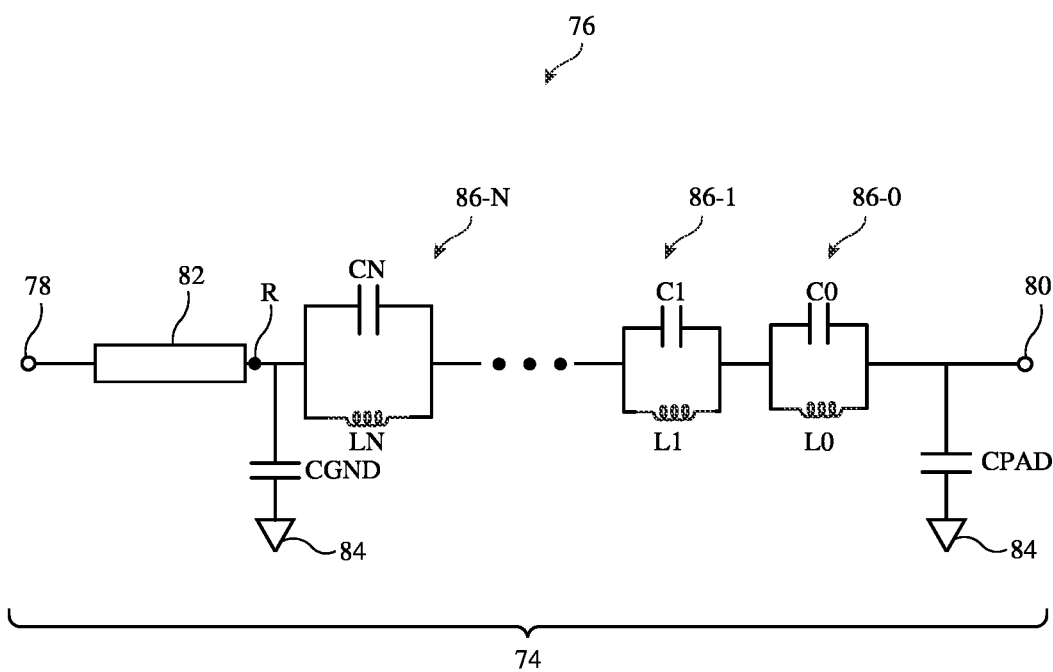
FIG. 6 is a transmission line model of illustrative multi-layer impedance matching structures in accordance with some embodiments.

FIG. 6 shows a transmission line model 76 for multi-layer impedance matching structures 74 of FIG. 4. As shown in transmission line model 76 of FIG. 6, multi-layer impedance matching structures 74 may have a first terminal 78 (e.g., at signal trace 66 of FIG. 4) and a second terminal 80 (e.g., at contact pad 60 of FIG. 6). Multi-layer impedance matching structures 74 may have a transmission line transition 82 formed from signal trace 68 (FIGS. 4 and 5). The width and length of signal trace 68 may be selected to transform real impedance to standard impedance (e.g., the impedance of signal trace 66 of FIG. 4 such as 50 Ohm impedance). A capacitance CGND may be coupled between the signal trace and ground 84. Capacitance CGND may be established between via pad 70-N and ground traces 62 of FIG. 4.

Multi-layer impedance matching structures 74 may include N resonant circuits 86 coupled in series between transmission line transition 82 and terminal 80 (e.g., a first resonant circuit 86-0, an Nth resonant circuit 86-N, etc.). Each resonant circuit 86 may include a corresponding parallel-coupled capacitance C and inductance L (e.g., resonant circuit 86-N may have a capacitance CN coupled in parallel with inductance LN, resonant circuit 86-0 may have a capacitance C0 coupled in parallel with inductance L0, etc.). Each capacitance C is determined by the areas A of a respective pair of via pads 70 in multi-layer transmission line structures 74. Each inductance L is determined by the width W and thus the aspect ratio of a respective conductive via 72 in multi-layer transmission line structures 74. For example, the areas A of via pads 70-N and 70-(N−1) of FIG. 4 may be selected to produce capacitance CN of resonant circuit 86-N, the width WN of conductive via 72-N may be selected to produce inductance LN of resonant circuit 86-N, the areas A0 and A1 of via pads 70-0 and 70-1 may be selected to produce capacitance C1 of resonant circuit 86-1, the width W1 of conductive via 72-1 may be selected to produce inductance L1 of resonant circuit 86-1, etc. A capacitance CPAD may also be coupled between the output of resonant circuit 86-0 and ground 84. Capacitance CPAD may be established between contact pad 60 and ground traces 62 of FIG. 4. Opening 64 in ground traces 62 may be used to counteract an increase in the capacitances between the via pads and the ground traces. The widths W of conductive vias 72 and thus the inductances L in transmission line model 76, the areas A of via pads 70 and thus the capacitances C in transmission line model 76, and optionally the dimensions of opening 64 may be selected to have a real impedance at reference point R, which serves to match the impedance of terminal 78 to the impedance of terminal 80.

Figure 7:
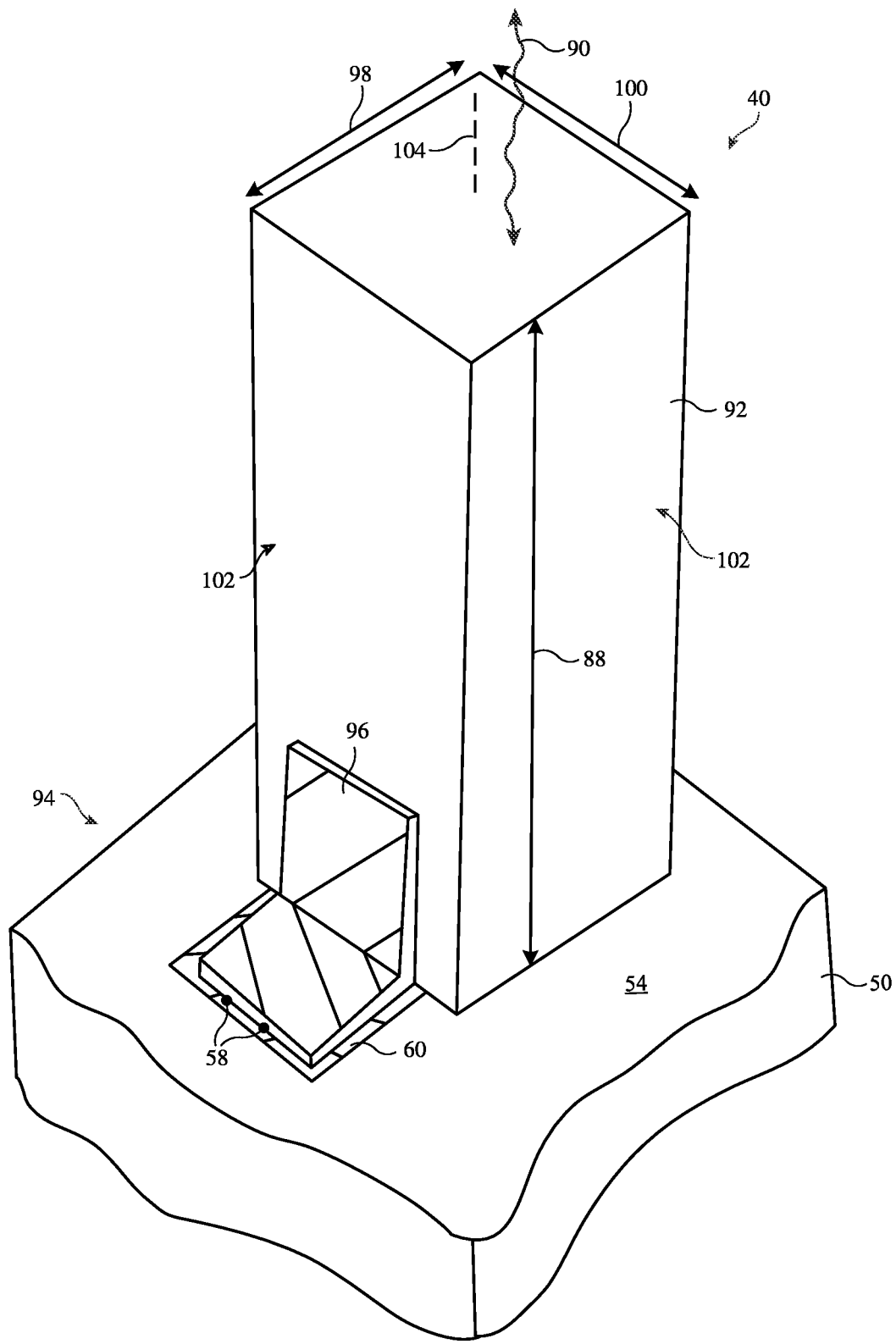
FIG. 7 is a perspective view of an illustrative dielectric resonator antenna that may be fed using multi-layer impedance matching structures in accordance with some embodiments.

FIG. 7 is a perspective view of an illustrative dielectric resonator antenna having a probe feed that may form radio-frequency component 56 of FIG. 4. As shown in FIG. 7, antenna 40 may include a dielectric resonating element such as dielectric resonating element 92. Dielectric resonating element 92 may be mounted to an underlying substrate such as substrate 50. Contact pad 60 may be patterned onto surface 54 of substrate 50. Multi-layer impedance matching structures 74 (FIG. 4) may underly contact pad 60 and couple contact pad 60 to a corresponding signal trace 66 in substrate 50 (not shown in FIG. 7 for the sake of clarity).

Dielectric resonating element 92 of antenna 40 may be formed from a column (pillar) of dielectric material mounted or otherwise coupled to surface 54 of substrate 50. If desired, dielectric resonating element 92 may be embedded within (e.g., laterally surrounded by) an additional dielectric substrate mounted to surface 54 of substrate 50 (not shown in FIG. 7 for the sake of clarity). The additional dielectric substrate may be an injection-molded plastic substrate in one suitable arrangement. Antenna 40 of FIG. 7 may be formed in a phased antenna array of antennas having dielectric resonating elements such as dielectric resonating element 92. Each dielectric resonating element in the phased antenna array may, if desired, be embedded within the same injection-molded plastic substrate. The operating (resonant) frequency of antenna 40 may be selected by adjusting the dimensions of dielectric resonating element 92.

Dielectric resonating element 92 may be formed from a column of dielectric material having a first dielectric constant. The first dielectric constant may be relatively high (e.g., greater than 10.0, greater than 12.0, greater than 15.0, greater than 20.0, between 15.0 and 40.0, between 10.0 and 50.0, between 18.0 and 30.0, greater than 30.0, between 12.0 and 45.0, etc.). In one suitable arrangement, dielectric resonating element 92 may be formed from zirconia or a ceramic material. Other dielectric materials may be used to form dielectric resonating element 92 if desired. The additional dielectric substrate surrounding dielectric resonating element 92 may have a dielectric constant that differs from the dielectric constant of dielectric resonating element 92 by at least a predetermined margin. The difference in dielectric constant between dielectric resonating element 92 and the surrounding additional dielectric substrate may establish a strong radio-frequency boundary condition that configures dielectric resonating element 92 to serve as a waveguide for propagating radio-frequency signals at millimeter and centimeter wave frequencies.

Dielectric resonating element 92 may radiate radio-frequency signals 90 when excited by the transmission line path coupled to contact pad 60. Antenna 40 may be fed using one or more radio-frequency feed probes such as feed probe 94. Feed probe 94 may form part of the antenna feed for antenna 40 (e.g., antenna feed 44 of FIG. 3). As shown in FIG. 7, feed probe 94 may include feed conductor 96. In one suitable arrangement that is described herein as an example, feed conductors 96 may be formed from stamped sheet metal that has been folded into a desired shape and that is press against a given sidewall 102 of dielectric resonating element 92. If desired, biasing structures (not shown in FIG. 6 for the sake of clarity) may hold or press feed conductor 96 against sidewall 102 to help ensure a reliable coupling between the feed conductor and the dielectric resonating element. In another suitable arrangement, feed conductor 96 may be formed from a conductive trace that is patterned directly onto sidewall 102 (e.g., using a laser direct structuring (LDS) process, a sputtering process, or other conductive metallization techniques).

Feed conductor 96 may have a first portion on a first sidewall 102 of dielectric resonating element 92. Feed conductor 96 may have a second portion coupled to contact pad 60 using solder 58 (e.g., feed probe 94 may form radio-frequency component 56 of FIG. 4). The transmission line path coupled to contact pad 60 may convey radio-frequency signals to and from feed probe 94. Feed probe 94 may electromagnetically couple the radio-frequency signals into dielectric resonating element 92. This may serve to excite one or more electromagnetic modes (e.g., radio-frequency cavity or waveguide modes) of dielectric resonating element 92. When excited by feed probe 94, the electromagnetic modes of dielectric resonating element 92 may configure the dielectric resonating element to serve as a waveguide that propagates the wavefronts of radio-frequency signals 90 along the length of dielectric resonating element 92 and through the top surface of dielectric resonating element 92 (e.g., in the direction of the central/longitudinal axis 104 of dielectric resonating element 92).

For example, during signal transmission, the transmission line path coupled to contact pad 60 may supply radio-frequency signals from the millimeter/centimeter wave transceiver circuitry to antenna 40. Feed probes 94 may couple the radio-frequency signals into dielectric resonating element 92. This may serve to excite one or more electromagnetic modes of dielectric resonating element 92, resulting in the propagation of radio-frequency signals 90 up the length of dielectric resonating element 92. Similarly, during signal reception, radio-frequency signals 90 may be received by dielectric resonating element 92. The received radio-frequency signals may excite the electromagnetic modes of dielectric resonating element 92, resulting in the propagation of the radio-frequency signals down the length of dielectric resonating element 92. Feed probes 94 may couple the received radio-frequency signals onto the underlying transmission line path, which passes the radio-frequency signals to the millimeter/centimeter wave transceiver circuitry. The multi-layer impedance matching structures 74 (FIG. 4) coupled to contact pad 60 may ensure that there is a smooth impedance transition between feed probe 94 and the rest of the transmission line path. This may serve to minimize signal reflections along the transmission line path, thereby maximizing the antenna efficiency of antenna 40.

Dielectric resonating element 92 may have a length 98, a width 100 (e.g., measured orthogonal to length 98), and a height 88 (e.g., measured parallel to central/longitudinal axis 104 and orthogonal to length 98 and width 100). Length 98, width 100, and height 88 may be selected to provide dielectric resonating element 92 with a corresponding mix of electromagnetic cavity/waveguide modes that, when excited by feed probe 94 and/or the additional feed probe, configure antenna 40 to radiate at desired frequencies. For example, height 88 may be 2-10 mm, 4-6 mm, 3-7 mm, 4.5-5.5 mm, or greater than 2 mm. Width 100 and length 98 may each be 0.5-1.0 mm, 0.4-1.2 mm, 0.7-0.9 mm, 0.5-2.0 mm, 1.5 mm-2.5 mm, 1.7 mm-1.9 mm, 1.0 mm-3.0 mm, etc. Width 100 may be equal to length 98 or, in other arrangements, may be different than length 98.

The example of FIG. 7 is merely illustrative. If desired, dielectric resonating element 92 may also be fed by an additional feed probe coupled to a sidewall 102 orthogonal to that of feed probe 94. The additional feed probe may be coupled to an additional transmission line path and additional multi-layer impedance matching structures. Feed probe 94 and the additional feed probe may allow dielectric resonating element 92 to cover orthogonal linear polarizations or other polarizations, for example. Feed probe 94 may sometimes be referred to herein as a feed conductor, feed patch, or probe feed. Dielectric resonating element 92 may sometimes be referred to herein as a dielectric radiating element, dielectric radiator, dielectric resonator, dielectric antenna resonating element, dielectric column, dielectric pillar, radiating element, or resonating element. When fed by one or more feed probes such as feed probe 94, dielectric resonator antennas such as antenna 40 of FIG. 7 may sometimes be referred to herein as probe-fed dielectric resonator antennas. Dielectric resonating element 92 may have other shapes. In general, any desired radio-frequency structures may form radio-frequency component 56 of FIG. 4.

Device 10 may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users The foregoing is merely illustrative and various modifications can be made by those skilled in the art without departing from the scope and spirit of the described embodiments. The foregoing embodiments may be implemented individually or in any combination.

What is claimed is:

1. An electronic device comprising:
a dielectric substrate having stacked dielectric layers;
a contact pad on a surface of the dielectric substrate;
a radio-frequency component mounted to the contact pad;
a radio-frequency transmission line path having a signal trace embedded in the dielectric substrate, wherein the radio-frequency transmission line path and the radio-frequency component are configured to convey radio-frequency signals; and
impedance matching structures that are embedded in the dielectric substrate and that couple the signal trace to the contact pad, wherein the impedance matching structures comprise a set of conductive vias with different aspect ratios.

2. The electronic device of claim 1, the impedance matching structures comprising a set of via pads, the set of conductive vias being coupled in series between the signal trace and the contact pad, each via pad in the set of via pads having a lateral area, and wherein the lateral area varies across the set of via pads.

3. The electronic device of claim 1, the impedance matching structures comprising a set of via pads, and the set of conductive vias being coupled in series between the signal trace and the contact pad.

4. The electronic device of claim 3, wherein each via pad in the set of via pads has a lateral area and the lateral area varies across the set of via pads.

5. The electronic device of claim 1, further comprising:
a dielectric resonator antenna having a dielectric resonating element mounted to the surface of the dielectric substrate, wherein the radio-frequency component comprises a feed probe for the dielectric resonator antenna.

6. The electronic device of claim 1, wherein the radio-frequency component comprises a board-to-board connector.

7. The electronic device of claim 1, wherein the radio-frequency component comprises an interposer.

8. The electronic device of claim 1, wherein the impedance matching structures comprise:
a first via pad having a first lateral area; and
a second via pad having a second lateral area that is different from the first lateral area.

9. The electronic device of claim 8, further comprising:
ground traces embedded in the dielectric substrate, wherein the ground traces have an opening that overlaps the radio-frequency component.

10. The electronic device of claim 9, wherein the impedance matching structures comprise:
an additional signal trace that couples the first via pad to the signal trace, wherein the additional signal trace is wider than the signal trace.

11. An electronic device comprising:
a dielectric substrate having stacked dielectric layers;
a contact pad on a surface of the dielectric substrate;
a radio-frequency component mounted to the contact pad;
a radio-frequency transmission line path having a signal trace embedded in the dielectric substrate, wherein the radio-frequency transmission line path and the radio-frequency component are configured to convey radio-frequency signals; and
impedance matching structures that are embedded in the dielectric substrate and that couple the signal trace to the contact pad, wherein the impedance matching structures comprise a set of conductive vias, a first via pad having a first lateral area, and a second via pad having a second lateral area that is different from the first lateral area.

12. The electronic device of claim 11, wherein the impedance matching structures comprise:
a third via pad;

a first conductive via that couples the first via pad to the second via pad, the first conductive via having a first width; and
a second conductive via that couples the second via pad to the third via pad, the second conductive via having a second width that is different from the first width.

13. An electronic device comprising:
a dielectric substrate having a first, second, and third layers, the second layer being interposed between the first and third layers;
a first via pad on the first layer;
a first conductive via coupled to the first via pad and having a first aspect ratio;
a second via pad on the second layer;
a second conductive via coupled to the second via pad and having a second aspect ratio that is different from the first aspect ratio;
a contact pad on the third layer;
a radio-frequency component surface-mounted to the contact pad; and
a radio-frequency transmission line path having a signal conductor in the dielectric substrate that is coupled to the radio-frequency component through the first via pad, the first conductive via, the second via pad, and the second conductive via, the radio-frequency transmission line path and the radio-frequency component being configured to convey radio-frequency signals at a frequency greater than 10 GHz.

14. The electronic device of claim 13, wherein the first via pad has a first lateral area and the second via pad has a second lateral area that is different from the first lateral area.

15. The electronic device of claim 13, further comprising:
a fourth layer in the dielectric substrate, the first layer being interposed between the fourth and second layers;
a third via pad on the fourth layer; and
a third conductive via coupled to the third via pad.

16. The electronic device of claim 15, wherein the third conductive via has a third aspect ratio that is different from the first and second aspect ratios.

17. An electronic device comprising:
a dielectric substrate having a first, second, and third layers, the second layer being interposed between the first and third layers;
a first via pad on the first layer and having a first lateral area;
a first conductive via coupled to the first via pad;
a second via pad on the second layer and having a second lateral area that is different from the first lateral area;
a second conductive via coupled to the second via pad;
a contact pad on the third layer;
a radio-frequency component surface-mounted to the contact pad; and
a radio-frequency transmission line path having a signal conductor in the dielectric substrate that is coupled to the radio-frequency component through the first via pad, the first conductive via, the second via pad, and the second conductive via, the radio-frequency transmission line path and the radio-frequency component being configured to convey radio-frequency signals at a frequency greater than 10 GHz.

18. The electronic device of claim 17, further comprising:
a fourth layer in the dielectric substrate, the first layer being interposed between the fourth and second layers;
a third via pad on the fourth layer and having a third lateral area that is different from the first and second lateral areas; and
a third conductive via coupled to the third via pad.

19. The electronic device of claim 17, further comprising:
a dielectric resonator antenna having a dielectric resonating element mounted to the third layer, wherein the radio-frequency component comprises a feed probe for the dielectric resonator antenna.

* * * * *